UNITED STATES PATENT OFFICE.

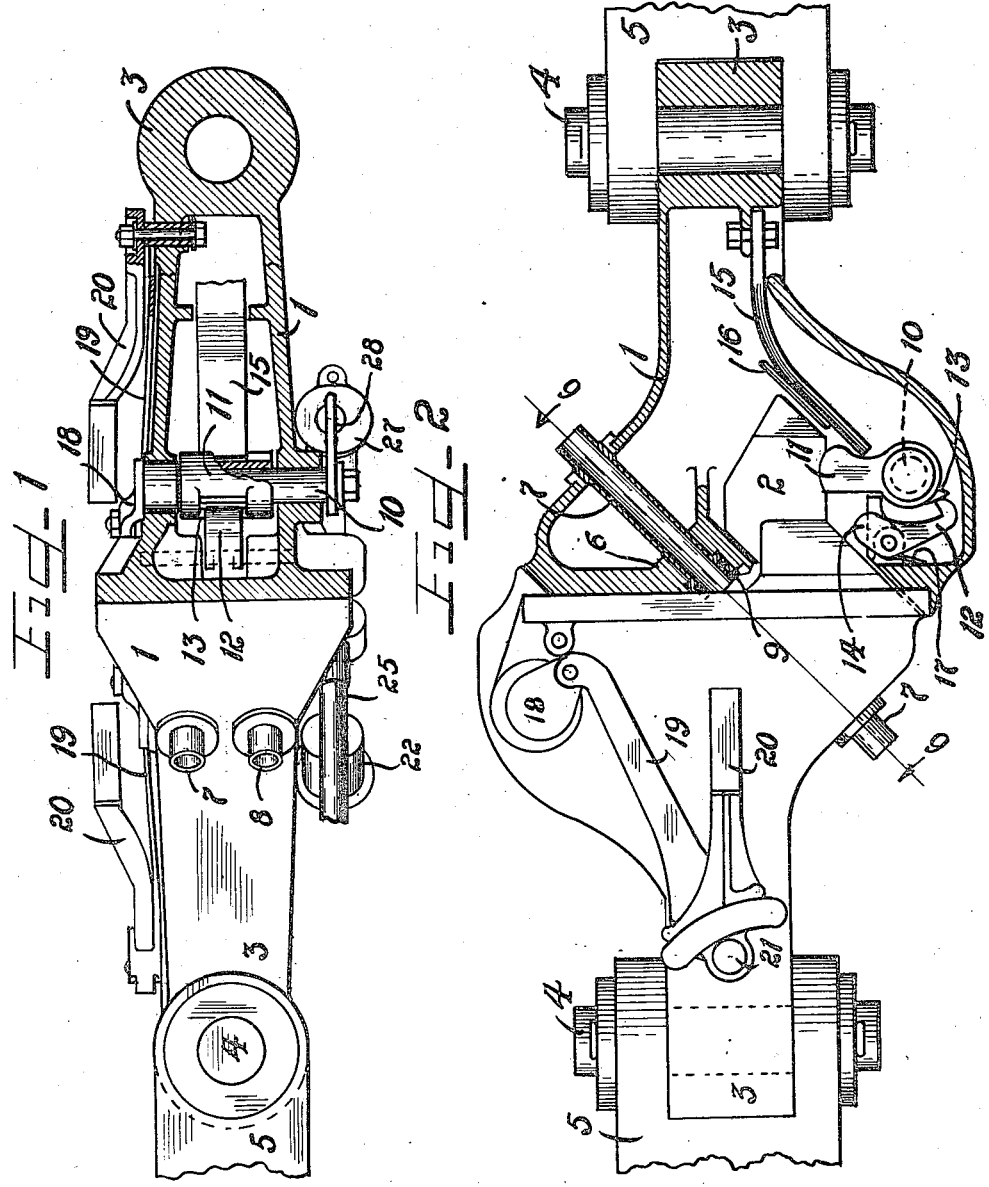

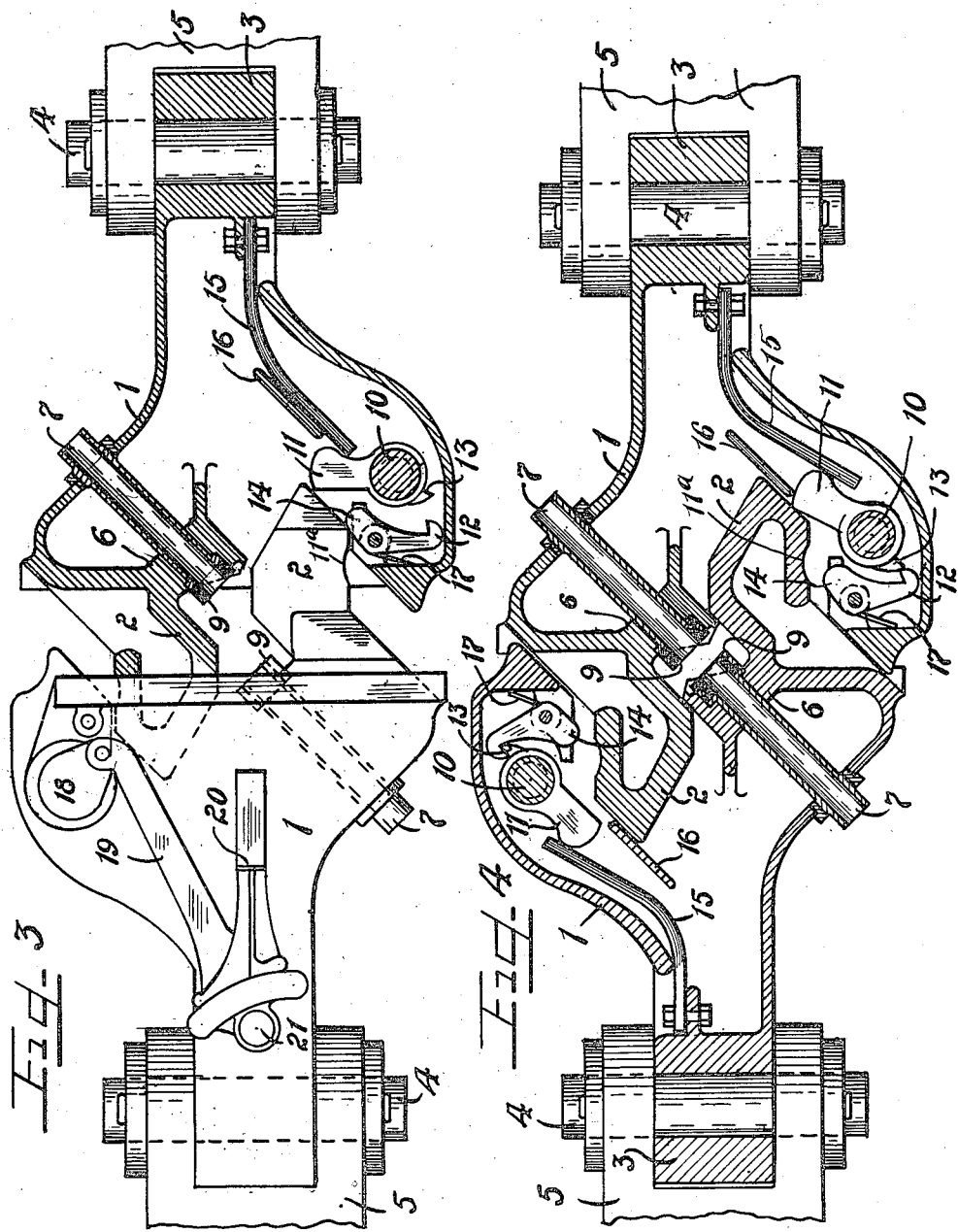

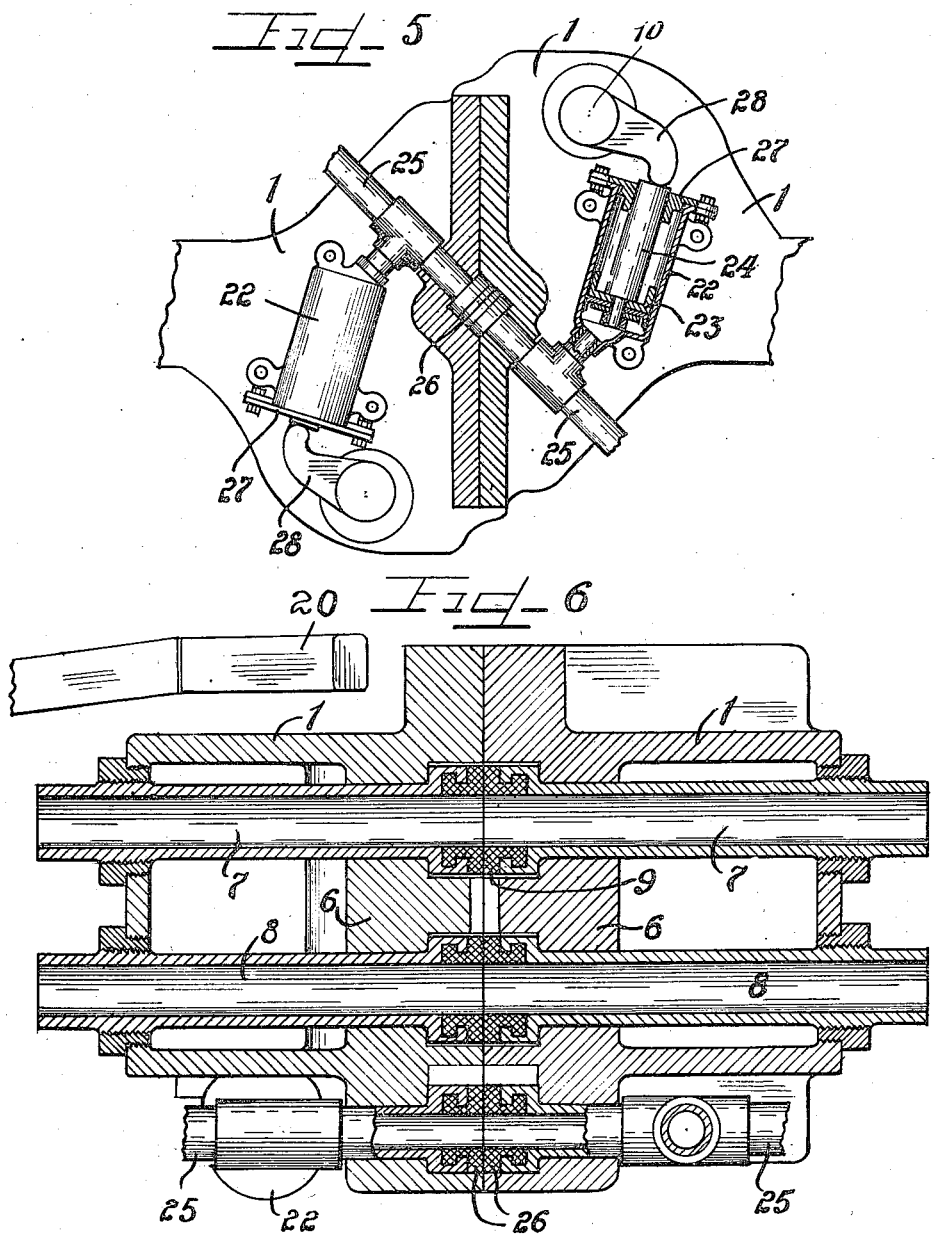

HERBERT E. VAN DORN, OF CHICAGO, ILLINOIS, ASSIGNOR TO VAN DORN COUPLER COMPANY, OF CHICAGO, ILLINOIS, A CORPORATION OF ILLINOIS.

CAR AND AIR COUPLING.

1,224,240.  Specification of Letters Patent.  Patented May 1, 1917.

Application filed June 18, 1915. Serial No. 34,787.

*To all whom it may concern:*

Be it known that I, HERBERT E. VAN DORN, a citizen of the United States, and a resident of the city of Chicago, in the county of Cook and State of Illinois, have invented certain new and useful Improvements in Car and Air Couplings; and I do hereby declare that the following is a full, clear, and exact description of the same, reference being had to the accompanying drawings, and to the numerals of reference marked thereon, which form a part of this specification.

This invention relates to an improved form of car coupler adapted to connect the air lines or other fluid lines of a train coincidently with the coupling of the cars. This is effected by suitable pipe lines associated with the coupler heads which are brought into juxtaposition with one another at the time the drawheads are locked in coupled relation, so that a flow of fluid through said respective coupled pipe lines is readily permitted without possibility of leakage. Of course suitable levers are mounted upon the respective coupler heads for unlocking the same when it is desired to uncouple the cars, and in addition thereto fluid operated means are provided for releasing the couplers one from another independently of said levers if so desired.

It is an object of this invention to construct a coupler provided with fluid lines associated therewith adapted to be coupled one to another when the device is coupled, and with means for automatically locking the device in locked position when the heads are engaged with one another.

It is also an object of this invention to construct a coupler adapted to automatically lock when the coupler heads are engaged with one another, and at the same time effect sealing communication between fluid lines associated with the coupler heads, and with means connected with the respective coupler heads, to unlock the same by fluid pressure.

It is also an object of this invention to construct an automatic coupler provided with fluid lines adapted to be connected to one another in sealing relation when the coupler is coupled, and with fluid operated and manually actuated means each adapted to unlock the coupler to permit uncoupling thereof.

It is also an object of this invention to construct an improved type of automatic coupler wherein a pivoted spring actuated locking block is mounted within each of the coupler heads to engage within a recessed portion of the complemental knuckle of another coupler head to hold the same engaged, and with a locking pawl adapted to hold said locking block in release position against the tension of its spring prior to an uncoupling of the device.

It is furthermore an important object of this invention to construct a coupler wherein hollow integral heads provided with knuckles adapted to interfit in complemental recesses in the respective coupler heads are provided with locking mechanism mounted within the coupler head and actuatable either by fluid mechanisms or manually, as desired.

It is finally an object of this invention to construct a simple and improved type of automatic coupler having associated therewith fluid lines to be connected by engagement of the coupler heads.

The invention (in a preferred form) is illustrated in the drawings and hereinafter more fully described.

In the drawings:

Figure 1 is a side elevation of a coupler in coupled position with one of the coupler heads shown partly in section.

Fig. 2 is a top plan view of the couplers shown in Fig. 1, with one of the coupler heads in section.

Fig. 3 is a top plan view with one of the coupler heads in section, showing the position of the parts during a coupling operation.

Fig. 4 is a top view with both of the coupler heads in section, showing the locking mechanism of one locked in release position for uncoupling, and the locking mechanism of the other in the position taken by the parts during a coupling operation.

Fig. 5 is a fragmentary bottom plan view partly in section of the device in coupled position showing the fluid actuating means for releasing the same.

Fig. 6 is a central vertical section taken on line 6—6 of Fig. 2.

As shown in the drawings:

Inasmuch as the coupler heads are identical in construction, a description of one will suffice. The coupler heads 1, are cored out to afford a hollow interior, and each drawhead is provided with an integral angled knuckle 2, adapted to fit into a complemental recess of the other drawhead. Each of said drawheads is provided with a tail piece 3, which is apertured to receive a pivot pin 4, therethrough, extending through a drawbar 5, on which the coupler head is thus supported. The coupler heads are each provided with a vertically disposed oblique abutment wall 6, through which projects at right angles thereto the respective fluid lines or pipes 7 and 8, each being provided at its end with a yieldable compression washer 9, so that when the coupler heads are locked together said washers are compressed tightly against one another to afford a seal between the connected pipes.

Journaled vertically in each of the drawheads adjacent the recess in which the complemental locking knuckle is received, are vertical pivot bolts 10, the ends of which project through the top and bottom walls of the drawhead, and rigidly secured upon each of said bolts within the respective drawheads are locking blocks 11. The outer end of each of said locking blocks 11 is curved to fit into a complementally curved recess 11ᵃ in the respective complemental locking knuckle 2, when the same is inserted sufficiently into the drawhead, thus preventing withdrawal of the knuckle until said locking block has been retracted. For the purpose of retaining said locking block retracted in order to permit release of the coupler drawheads during an uncoupling of the device, a pawl 12, is pivoted adjacent said block, and is adapted to engage over a small projection or tooth 13, formed on said locking block. Said locking pawl 12, is provided with a tail piece 14, which projects into the path of an entering knuckle 2, so that during a coupling operation the entering knuckle strikes the tail piece of the locking pawl 12, thereby releasing the locking block and permitting the same to engage the knuckle when the knuckle has fully entered the drawhead if the same has been unlocked after uncoupling. In order to impel the locking block 11, into locking engagement with an entering knuckle, a long leaf spring 15, secured within the drawhead on the rear wall or tail portion 3, thereof, and is of a length to at all times bear at some point upon the rear surface of the locking block.

A vertical partition wall 16, is formed within each of the drawheads and serves a double purpose; namely, that of limiting the amplitude of movement of the spring member 15, as it thrusts the locking block into locking position, and also as a guide wall for the entering knuckle 2, of the complemental drawhead. A small spring 17, is wound about the pivot pin for the locking pawl 12, and acts to normally impel said pawl into a position to engage the tooth 13, on the locking block. For the purpose of actuating the locking block into release position a short crank 18, is rigidly secured upon the upper end of the pivot bolt 10, in the drawhead, and pivoted to the end of the crank is a link 19, which, at its other end, is pivotally connected to a lever 20, which is in turn pivoted upon a stud 21, on the outer surface of the top wall of the drawhead. Thus, when said handle 20, is manually actuated, the respective locking block 11, is moved into a release position against the stress of the spring 15, within the drawhead.

Mechanisms are also provided for actuating the blocks of the drawheads into release position by fluid pressure, and for this purpose a small cylinder 22, is rigidly secured in an oblique position upon the under surface of each drawhead, and is provided with a piston 23, and a piston rod 24.

One end of said cylinder 22, communicates, by means of a suitable pipe connection, with a pipe 25, which is rigidly secured upon the under surface of the drawhead parallel said respective pipes 7 and 8, and similar to said latter pipes terminates in the oblique partition wall 6, with a compression washer 26, secured on the end thereof adapted to seal with a similar washer on a similar pipe in the complemental drawhead. The other end of said cylinder 22, is closed by means of a suitable head 27, apertured centrally to receive the piston rod 24, therethrough, and the lower end of the pivot bolt 10, which extends through the wall of the drawhead, is provided with a crank 28, positioned to contact with the end of said piston rod 24, so that movement of the piston in the cylinder will cause movement of said crank. Of course valves may be provided in the pipe lines 25, at any suitable point in order to admit fluid to the respective cylinders 22, to actuate the locking block.

The operation is as follows:

Prior to the coupling of the device the locking blocks may be either locked in release position, as shown in the case of the block of the left hand drawhead of Fig. 4, or they may have been released into a position in the path of an entering knuckle 2, under the impulse of their respective springs 15. In the former case the entering knuckle strikes the tail 14, of the locking pawl, turning the same and thus releasing the locking block 11, allowing it to swing forward under the impulse of its spring, and as the knuckle end progresses into the drawhead and reaches its limit of movement, said locking block moves into engagement with the recessed curved portion 11ᵃ of the knuckle, thus preventing retraction of the knuckle from the drawhead. When a knuckle enters the drawhead and the locking block 11 is in release position, the block is merely swung back by the entering edge of the knuckle and then returns under the impulse of the spring 15, to lock the knuckle after the knuckle has reached its limit of movement. Of course when it is desired to uncouple the device it is only necessary to swing the locking blocks against their springs into position such that the locking pawls 12, will engage the teeth 13, of the respective blocks to hold the same retracted, and the knuckle may then be easily withdrawn from the drawhead.

The block mechanism serves to lock the knuckles tightly within the respective drawheads, so that an exceedingly rigid connection is afforded therebetween, and consequently the respective pipe lines 7, 8, and 25, are held coupled in sealing relation. The small spring 17, upon the locking pawl 12, serves to normally impel the same into a position to always engage the tooth 13, of the locking block when said block has been rotated into proper position for such engagement.

I am aware that various details of construction may be varied through a wide range without departing from the principles of this invention. I therefore do not purpose limiting the patent granted otherwise than necessitated by the prior art.

I claim as my invention:

1. In a device of the class described, a hollow drawhead, a knuckle integral therewith and adapted to fit in a complemental recess in an opposing drawhead, a partition wall integrally formed in said drawhead to guide an opposing knuckle, and means for retaining the knuckle in locked position.

2. In a device of the class described, a drawhead, a knuckle therein, locking means within said drawhead adapted to lock a complemental recess therein, a spring within the drawhead for actuating said locking means, a partition wall integrally formed within said drawhead and acting to limit the movement of said spring and to guide said complemental knuckle, means for moving said locking means into release position, and mechanism for retaining said locking means in release position.

In testimony whereof I have hereunto subscribed my name in the presence of two subscribing witnesses.

HERBERT E. VAN DORN.

Witnesses:
CHARLES W. HILLS, Jr.,
EARL M. HARDINE.